Patented Sept. 16, 1947

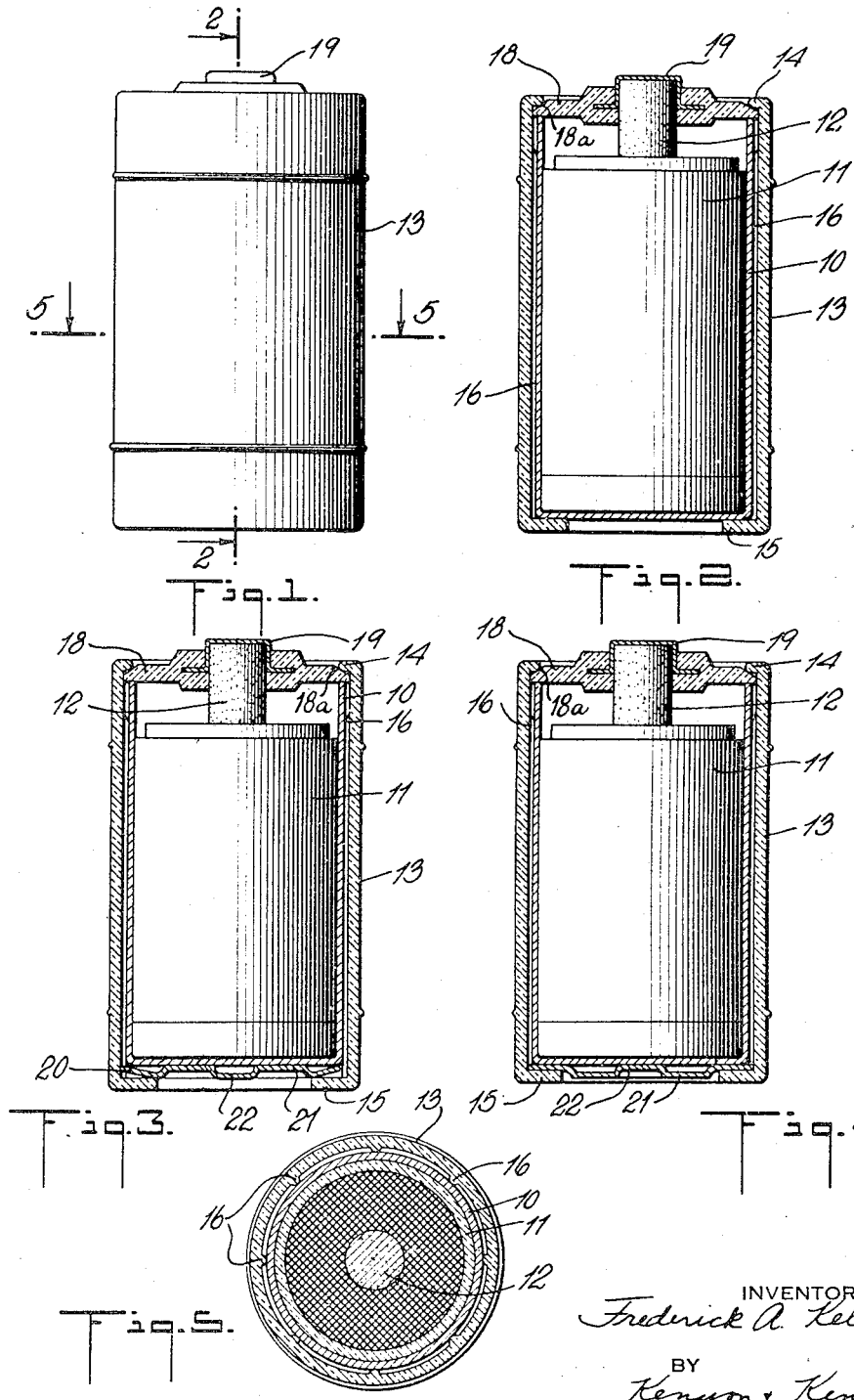

2,427,561

UNITED STATES PATENT OFFICE 2,427,561

FLASHLIGHT BATTERY WITH PLASTIC CASING

Frederick A. Keller, East Paterson, N. J., assignor to Bright Star Battery Company, Clifton, N. J., a corporation of New Jersey Application September 15, 1944, Serial No. 554,216

10 Claims. (Cl. 136—133)

This invention relates to flashlight batteries.

An object of this invention is an inexpensive and easily constructed flashlight battery enclosed in a plastic casing and having provision for materially reducing the harmful effects of gas and electrolyte escaping from the cup electrode of the battery.

Other objects, novel features and advantages of this invention will become apparent from the following specification and accompanying drawings, wherein:

Fig. 1 is a side elevation of a flashlight battery embodying the invention;

Figs. 2, 3 and 4 are sections on the line 2—2 of Fig. 1 showing various modifications of internal structure, and Fig. 5 is a section on the line 5—5 of Fig. 1.

In the drawings, 10 indicates the usual zinc cup of a flashlight battery in which is contained the usual cartridge 11 centrally of which is provided the standard carbon electrode 12. The electrode 12 is embedded in the cartridge in the usual manner and projects beyond the rim of the cup 10 which also constitutes one electrode of the flashlight battery. A shell 13 of plastic material such, for example, as ethyl cellulose, or other suitable material surrounds the cup 10 and is provided at one end with an inwardly projecting shoulder 14 and at the other end with an inwardly projecting flange 15, the flange 15 being of materially greater width than the shoulder 14. The interior surface of the shell 13 is provided with a series of longitudinal ribs 16 engaging the outer surface of the cup 10 thereby forming a plurality of spaces or pockets between the outer surface of the cup 10 and the inner surface of the shell 12 to provide storage space for gases or electrolyte escaping from the interior of the shell. This storage space accommodates the escaping materials without causing any distortion of the shell and avoids the previous disadvantages resulting in other types of cells from material escaping from the cartridge.

A closure disk 18 has a tapering rim 18a fitting between the shoulder 14 and the rim of the cup 10. The closure disk 18 preferably is composed of the same material as the shell 13 and contains a cap 19 of brass or suitable material adapted to receive the end of the central electrode 12. The cap 19 has a flange embedded in the closure 18 to prevent escape of gases from the interior of the battery along the central electrode 12, and has a portion projecting above the surface of the disk 18. The rim of the closure 18 is of somewhat larger diameter than the interior diameter of the shoulder 14 and is introduced into the shell by being forced into place with simultaneous enlargement of the open end of the shell sufficient for that purpose, the shell being resilient enough to permit such distortion thereof. A gas-tight seal is provided between the closure 18 and the shoulder 14 through the use of a suitable solvent or cement to effect a tight union therewith.

In the modification of Fig. 2, the bottom of the cup 10 directly engages the flange 15 and the dimensions of the shell 13 and closure 18 are such that the flange 15 is held tightly against the bottom of the cup to effect a tight seal therebetween. Electrical connection between the battery of Fig. 2 and another battery cell is effected by introduction of the cap of the central terminal to the second battery through the opening defined by the inner periphery of the flange 15 into contact with the bottom of the cup 10.

In the modification of Figs. 3 and 4, a metal disk 20 is introduced between the bottom of the cup 10 and the flange 15. The disk has an offset portion 21 of substantially the same diameter as the inner periphery of the flange 15 and has a central projection 22 of less area than the cap 19 struck out from the offset 21 and directed oppositely to the offset 21. The disk 20 assists in producing a tight fit between the bottom of the cup 10 and the flange 15. With the disk in the position shown in Fig. 3, the projection 22 is engageable with the center terminal cap of another flashlight battery for the purpose of electrically connecting the two batteries together. With the disk in the arrangement shown in Fig. 4, the offset 21 projects partially through the opening defined by the flange 15 and is in position to be contacted by the central terminal of a similar battery. In this arrangement, the projection 22 also engages the bottom of the cup 10.

In the manufacture of the various modifications above described, the shell 13 is made by an injection molding operation and the closure 18 with the cap 19 embedded therein likewise is produced by an injection molding operation. In the Fig. 2 modification, the cup 10 and its contents are introduced into the shell 13 and the closure 18 snapped into place with the carbon electrode 12 fitting into the cap 19 and resting on the rim of the cup 10. The closure 18 is then cemented or otherwise sealed to the shoulder 15. In the modification of Figs. 3 and 4, the disk 20 is introduced into the shell 13 ahead of the cup 10 and is arranged either as shown in Fig. 3 or as shown in Fig. 4 as desired. In each of these modifications, the disk 20 serves to make contact between the cup 11 and the center terminal of another flashlight battery.

It is of course understood that various modifications may be made in the flashlight battery above described without in any way departing from the spirit of the invention as defined in the appended claims.

I claim:

1. A flashlight battery comprising a cylindrical shell of insulating material having an inwardly extending flange at one end, a metal cup electrode arranged within said shell, a closure of insulating material fastened to and closing the remaining end of said shell, a cartridge in said cup electrode, a central electrode in said cartridge and a cap for said central electrode mounted in said closure with a portion of the cap projecting beyond the outer face of said closure, said shell having longitudinal ribs engaging said cup electrode to define a plurality of pockets between the outer surface of the cup and the inner surface of the shell.

2. A flashlight battery according to claim 1 characterized by a metal plate within said shell engaged by the end of said cup electrode and having a portion projecting into the shell aperture.

3. A flashlight battery according to claim 1 characterized by a metal plate interposed between the bottom of the cup and the shell flange.

4. A flashlight battery according to claim 1 characterized by said shell having an interiorly directed shoulder at its open end and said closure having its periphery located between said shoulder and the rim of said cup.

5. A flashlight battery according to claim 1 characterized by said shell having an interiorly directed shoulder at its open end and said closure being of greater overall diameter than the interior diameter of said shoulder, said closure having its periphery interposed between said shoulder and the rim of said cup.

6. A battery comprising a metallic cup containing a cartridge having a centrally arranged electrode, a cylindrical shell of plastic material fitting over said cup and having an inwardly directed flange at one end engaging the cup bottom, said shell having longitudinal ridges forming spaces between the exterior surface of the cup and the interior surface of the shell, a plastic material cover closing the remaining end of said shell and having a gas-tight seal with the shell rim, and a metal cap sealed in said cover with a portion of said cap exposed and with the end of said electrode received in said cap.

7. A battery according to claim 6 characterized by a metal disk interposed between said flange and the bottom of said cup, said disk having a circular offset portion projecting through the aperture defined by the inner edge of said flange.

8. A battery according to claim 6 characterized by said shell having an inwardly directed rib along its rim and said plastic material cover being of greater exterior diameter than the interior diameter of said rib, whereby said cover is forced into position with concomitant expansion of said shell rim.

9. A battery according to claim 6 characterized by a metal disk interposed between said flange and the bottom of said cup, said disk having a circular offset portion projecting into the aperture defined by the inner edge of said flange and further characterized by said shell having an inwardly directed rib along its rim and said plastic material cover being of greater exterior diameter than the interior diameter of said rib whereby said cover is forced into position with concomitant expansion of said shell rim.

10. A battery according to claim 6 characterized by a metal plate interposed between the bottom of the cup and the shell flange.

FREDERICK A. KELLER.

REFERENCES CITED

The following references are of record in the file of this patent:

UNITED STATES PATENTS

| Number | Name | Date |
| --- | --- | --- |
| 1,766,026 | Klock | June 24, 1930 |
| 2,198,423 | Anthony | Apr. 23, 1940 |
| 2,346,640 | Anthony | Apr. 18, 1944 |
| 224,328 | Converse | Feb. 10, 1880 |
| 2,143,245 | Lines | Jan. 10, 1939 |
| 2,392,795 | Anthony et al. | Jan. 8, 1946 |